United States Patent [19]
Leng et al.

[11] Patent Number: 6,121,558
[45] Date of Patent: *Sep. 19, 2000

[54] STEERING COLUMN SWITCH

[75] Inventors: Peter Leng, Russelsheim; Hans-Gunter Weiss, Bingen; Thomas Reuter, Bingen; Paul Junker, Bingen, all of Germany

[73] Assignee: Eaton Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/115,321

[22] Filed: Jul. 14, 1998

[30] Foreign Application Priority Data

Jul. 26, 1997 [DE] Germany ............. 197 32 232

[51] Int. Cl.⁷ ......................................... H01H 9/00
[52] U.S. Cl. ......................... 200/61.27; 200/61.54
[58] Field of Search .............. 200/61.54, 61.27, 200/61.87, 61.88

[56] References Cited

U.S. PATENT DOCUMENTS

| | | | |
|---|---|---|---|
| 4,180,713 | 12/1979 | Gonzales | 200/61.27 X |
| 4,252,290 | 2/1981 | Willey | 248/549 |
| 4,543,456 | 9/1985 | Iwata et al. | 200/61.54 |
| 5,661,276 | 8/1997 | Shibata | 200/61.54 |
| 5,744,769 | 4/1998 | Proctor et al. | 200/61.54 |
| 5,828,021 | 10/1998 | Uchiyama et al. | 200/61.54 |
| 5,859,396 | 1/1999 | Yokoyama | 200/61.54 |

*Primary Examiner*—Renee Luebke
*Attorney, Agent, or Firm*—Roger A. Johnston

[57] ABSTRACT

A steering column switch (1) comprises a carrier (2) with coordinated plug-in fastening (3), which is secured on a holder of the casing tube of the steering column of a motor vehicle, surrounded by a steering column housing, and keys (26, 30, 39) provided with switch elements. On the carrier (2) a plurality of keys (26, 30, 39) acting in different directions of activation are mounted, and these act on contact elements (13, 14) arranged in the carrier (2). The steering column switch (1) has a compact design and at the same time is capable of transmitting a plurality of switch functions, in particular, those of an electronic entertainment system present in a motor vehicle, and furthermore it is comfortable to operate and can be almost completely pre-assembled

4 Claims, 4 Drawing Sheets

STEERING COLUMN SWITCH

STATEMENT REGARDING FEDERALLY SPONSORED RESEARCH OR DEVELOPMENT

Not Applicable

BACKGROUND OF THE INVENTION

The invention pertains to a steering column switch with a carrier with coordinated plug-in fastening, which is secured on a holder of the casing tube of the steering column of a motor vehicle that is surrounded by a steering column housing; and, the switch is of the type having push keys provided with switching elements.

As is known, motor vehicles consist of a number of complicated subassemblies, and the subassembly of a steering column switch to be mounted on the casing tube of the motor vehicle represents a point of special concern.

Steering column switches are usually mounted radially to the steering column on its casing tube, such that the steering column switch cannot move relative to the steering wheel when the steering wheel and the steering column housed in the casing tube are moved. The steering column switch typically comprises a blinker switch and a running lights switch. Furthermore, the steering column switch often contains a windshield wiper lever for activating the stages of the windshield wipers and for activating the switch functions of the windshield washing system. Such steering column switches are known, for example, from DE-AS 28 10 790 and DE 35 32 532 C2. Each steering column switch has a number of structural elements which interact with each other and implement a large number of such aforesaid switching functions. These structural elements, to be accommodated in close space, thus result in a complicated layout of the steering column switch. It is therefore desirable to preassemble the individual structural elements as much as possible, depending on the type of vehicle, and then mount them on a carrier arranged on the casing tube of the steering column.

An electrical push key switch is known from DE 195 11 878 A1, which has a housing accommodating switching elements and several automatically-resetting push keys mounted off-center and arranged next to each other, each one with a switching element acting on a contact element. The housing of the switch is firmly connected to the steering wheel of a motor vehicle; and, the switch is particularly suited for initiating switching functions, such as temporary speed control (Tempomat) of the motor vehicle. However, the arrangement of the buttons next to each other requires increased volume to facilitate installation.

A motor vehicle will generally contain a radio and/or cassette player and/or CD player and/or CD changer, the operation of which is done directly on the device itself. Due to the necessary visual contact with the device when activating its control elements, the driver diverts his or her gaze at least briefly from the road and is thus distracted, which leads to inattention and frequently to an accident. Often, therefore, additional activation switches are arranged on the dashboard or on the middle console of the vehicle, by which it is possible to influence the functions of such an electronic entertainment device. However, these additional activation switches do not lie in the zone of direct view of the driver.

The purpose of the invention is to create a steering column switch of the kind previously mentioned, which has a compact construction and at the same time is capable of transmitting a plurality of switch functions, especially those of an electronic entertainment device present in a vehicle, and a switch which is comfortable to operate, and which can be almost entirely preassembled.

BRIEF SUMMARY OF THE INVENTION

According to the invention, the purpose is achieved in that a plurality of buttons acting in different directions of activation are mounted on a carrier, and these act on contact elements arranged in the carrier.

In this way, a steering column switch is provided which has an extremely compact construction and combines a plurality of switch functions, since the buttons are arranged in different positions on the steering column switch and thus can be activated in different spatial directions. There is thus a distinct ergonomic match-up between switch function and direction of activation, which virtually excludes mistakes in activating the buttons. As a result of the integration of these buttons acting in different directions in a compact carrier, which is secured in simple fashion by its plug-in fastening during the assembly of the vehicle to the holder of the casing tube of the steering column, the steering column switch can be completely preassembled, so that except for the actual plugging in no other direct actions are necessary during its assembly. As will be seen from the following description of the steering column switch according to the invention, no additional separate components are necessary, such as leaf springs, compression springs or similar parts, as the number of necessary parts is limited to a minimum.

In a further configuration of the invention, a circuit board with contact elements mounted on it is arranged on the carrier. These contact elements are activated by buttons arranged on the carrier and implement the particular switch function desired. Preferably, the contact elements are microswitches, as these are very easy to produce in large numbers and work very reliably, so that a large number of switching cycles can be carried out.

In order to enable an easy assembly and possibly a disassembly for purposes of repair and replacement of the circuit board, it is preferably secured to the carrier by means of clip connections. Thus, the clip connection can be loosened with minimum force and the circuit board can be removed from the carrier or mounted again. Furthermore, the circuit board is provided with a connection unit for connecting to lines to relay the switch functions of the contact elements activated by the buttons.

In a further modification of the invention, the carrier is arranged in a housing which is open toward the steering column housing and adjacent to it at one side. The open side of the carrier housing is provided with a gasket for this purpose, which lies against the steering column housing and which consists of an elastic rubber or synthetic material. This provides a secure dust-free seal of the steering column switch against the steering column housing, without any chafing marks being produced between these contact surfaces due to vibrations from the driving motion of the vehicle. On its other side, the carrier housing has openings to accommodate the push keys and the plug-in fastening fashioned on the carrier. Preferably, at least the carrier and the plug-in fastening are fashioned as a single-piece injection-molded plastic part. In this way, no additional effort is required to assemble the plug-in fastening and the carrier of the steering column switch.

Often the user will exert a lot of force to operate such elements, so that it is necessary for safety reasons that the steering column switch break off when subjected to such excessive force, for example, during an accident of the vehicle, in order to protect the driver against injury from the steering column switch. Accordingly, a predetermined breaking point is fashioned in the transitional area between the carrier and the plug-in fastening.

In order to prevent an unintentional turning of the steering column switch about its lengthwise axis, the plug-in fastening is provided with a triple groove guide, which can be introduced into a corresponding mating part of the steering column housing. The triple groove guide also prevents an improper installation of the steering column switch and secures its final position after the assembly. In this way, the influence of manufacturing tolerances is reduced to a minimum in respect of freedom from wobbling. In addition, the steering column switch is further positioned in that a clip arm is spring-mounted in the plug-in fastening, which engages with the holder of the casing tube of the steering column. The clip arm is coordinated with a release arm projecting into the interior of the switch, making it possible to release the installed switch from the outside and replace it.

In a further configuration of the steering column switch according to the invention, a number of push keys are provided to initiate particular switch functions assigned to them. Thus, on the front side of the carrier there is arranged a push key which can be activated in the linear direction of insertion of the carrier into the holder of the casing tube, the switching element of which activates a contact element fastened to the circuit board. The circuit board lies roughly parallel with the linear direction of activation of the push key; and, thus it is necessary to place the contact element assigned to the push key in a different installed position than the other contact elements for the other buttons. This is accomplished by having the one contact element secured in upright position on the circuit board relative to the other contact elements, so that the switching element of the push key can act unhindered on the contact element.

In order to allow the self-acting return movement of the push key to its starting position, the push key is spring-loaded against the corresponding contact element. This can be done conveniently by an elastic stop lug, fashioned as a single piece on the carrier, or alternatively by a compression spring which thrusts against the switching element of the push key. The push key itself is mounted in a seat fashioned as a single piece with the front side of the carrier.

An additional toggle key is arranged on either side of the push key at the front side of the carrier, and is activated perpendicular to the push key, the particular switch element being activated by a coordinated contact element secured to the circuit board. This arrangement of the toggle keys immediately next to the push key results in an easy operation of the steering column switch by the fingers of one hand of the driver is made possible. Likewise, a plurality of function keys are accommodated in the least space. Preferably, the toggle keys are each mounted in a bearing pedestal which forms a single piece with the carrier. Each bearing pedestal and each associated toggle key has pairs of brackets, the pairs of brackets of the bearing pedestal or the toggle key being provided with bearing journals and bearing journal openings, respectively, which mutually engage with each other.

In order to return each of the toggle keys to their initial zero or resting position after activation, each is retained by means of a spring element molded on the bearing pedestal, which thrusts against the inside of the toggle key. The end stop of the keys is located on the housing. Activation arms are formed on the keys, which act on the contact elements. The activation arms provide a discernible feeling of the movement of the switch key and limit the force applied to the corresponding microswitch and the circuit board.

In a further configuration of the steering column switch of the invention, a swivel key capable of moving up and down from a position of rest is arranged on one lengthwise side of the carrier, having two switch elements at a distance from each other, each of which activates a contact element secured to the upper side and the lower side of the circuit board. For sake of high functionality, the swivel key is likewise mounted in a bearing pedestal forming a single piece with the carrier. The bearing pedestal and the swivel key have pairs of brackets. The pairs of brackets of the bearing pedestal or the swivel key are provided with bearing journals or bearing journal openings, respectively, which mutually engage with each other. Furthermore, the swivel key is retained in its position of rest by means of a spring element formed on the bearing pedestal, which thrusts against the inside of the swivel key.

In order to be able to close the carrier in simple fashion and also make it easily accessible during repair, the carrier housing is fastened to the carrier by means of clip connections. The carrier housing can be secured to the carrier by light pressure or removed from the latter by exerting slight force against the clip connection.

In a preferred configuration, each of the keys is assigned a switching function for a radio and/or cassette player and/or CD player and/or CD changer present in the vehicle. It is of special advantage that two such switches are arranged oppositely on the holder of the casing tube of the vehicle's steering column. In this way, an especially large number of switching functions can be realized for one or more of these devices, because the steering column switch or switches are disposed in the region of immediate access of the driver, namely, in the region of the steering wheel of the vehicle. After a short time period of getting used to the arrangement, the driver is capable of operating the steering column switch or switches without looking at them, since the arrangement of the keys is attuned to the range of operation of the fingers of one hand. Thus, the driver knows precisely which key is operated by which finger in order to trigger a particular switching function. The arrangement of two opposite steering column switches results in the number of operating capabilities of the equipment contained in the vehicle being considerably increased. The circuit logic is different from that of the blinker switch or running lights switch, thus preventing any risk of confusion.

DETAILED DESCRIPTION OF THE INVENTION

Figure 1:
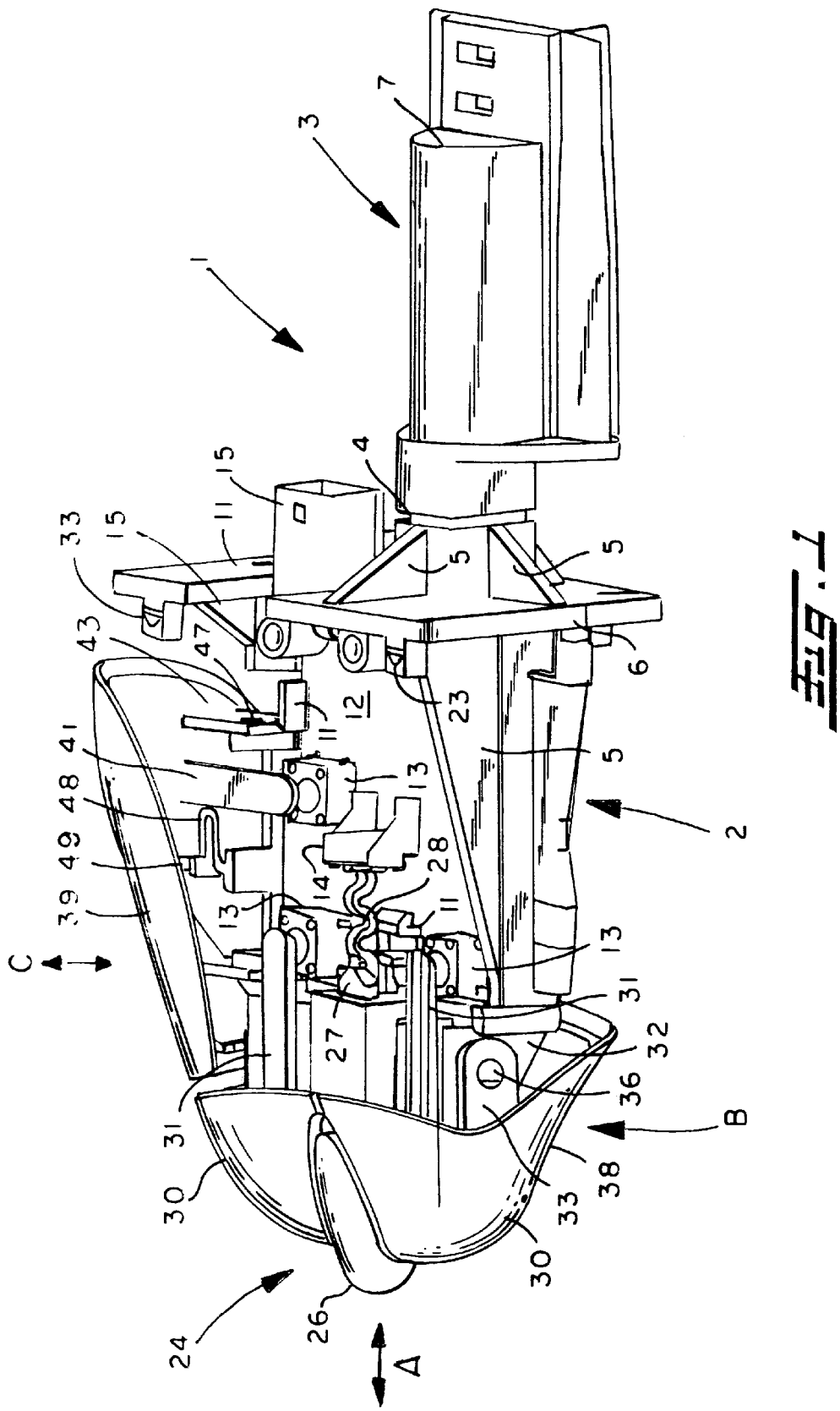
FIG. 1 is a perspective bottom view of a steering column switch according to the invention, leaving out the carrier housing.

Referring to FIG. 1, the steering column switch indicated generally at 1 consists of a carrier indicated generally at 2, on which is formed a plug-in fastening 3. The carrier 2 with the plug-in fastening 3 is fashioned as a single-piece injection-molded plastic part. In the transition zone between the carrier 2 and the plug-in fastening 3 there is formed a predetermined breaking site or frangible area 4 comprising the area formed by an annular groove. A vertical carrier wall 6, buttressed by reinforcements or gussets 5, having in turn reinforcements 5 against the carrier 2.

Figure 2:
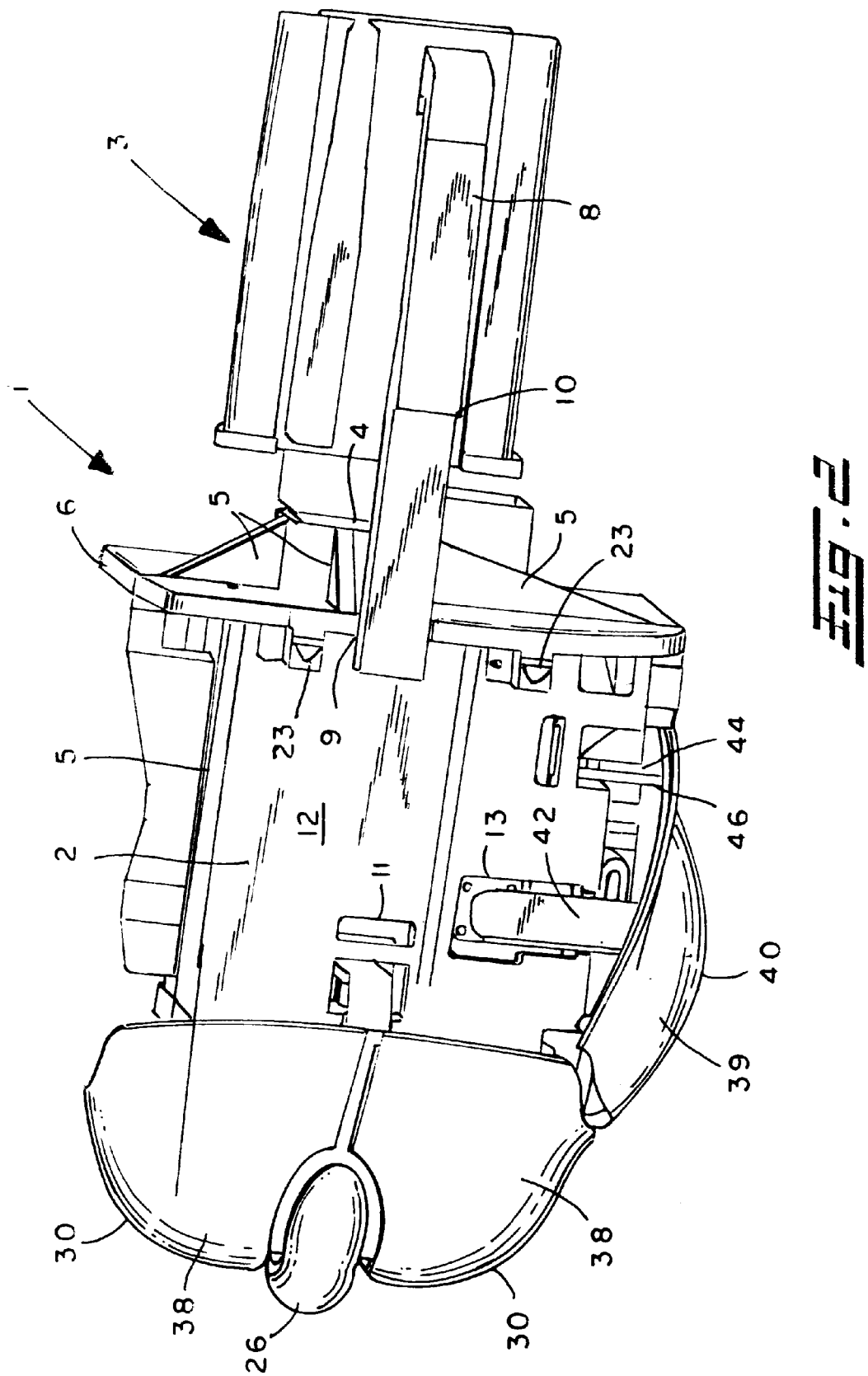
FIG. 2 is a perspective top view of the steering column switch of FIG. 1.

The plug-in fastening 3 protrudes in the direction of insertion of the steering column switch 1 and is intended for fastening to a holder of the casing tube of the steering column of a motor vehicle (not shown), surrounded by a steering column housing. For this, the plug-in fastening 3 is provided with a triple grooved guide 7, which is introduced into a corresponding mating piece (not shown) of the holder of the casing tube and which secures the steering column switch 1 in its installed position. Referring to FIG. 2, a clip arm 8 spring-loaded on the plug-in fastening 3 extends for the length of the plug-in fastening 3 to a groove 9 in the carrier wall 6. By placing the clip arm 8 in the groove 9 of the carrier wall 6, the clip arm 8 is springlike for its entire length. Furthermore, it is provided with a release arm.

In the carrier 2, a circuit board 12 is secured by several clip connections 11. On the top side of the circuit board 12, a plurality of contact elements 13 are fastened, in the form of microswitches. One of the contact elements 14 on the bottom side of the circuit board 12 is secured to it in an upright position as shown in FIG. 1. A connection unit 15, which is fastened on the circuit board 12, extends through an opening in the carrier wall 6. This connection unit 15 serves to connect leads (not shown) to transmit switch functions of the steering column switch 1.

Figure 3:
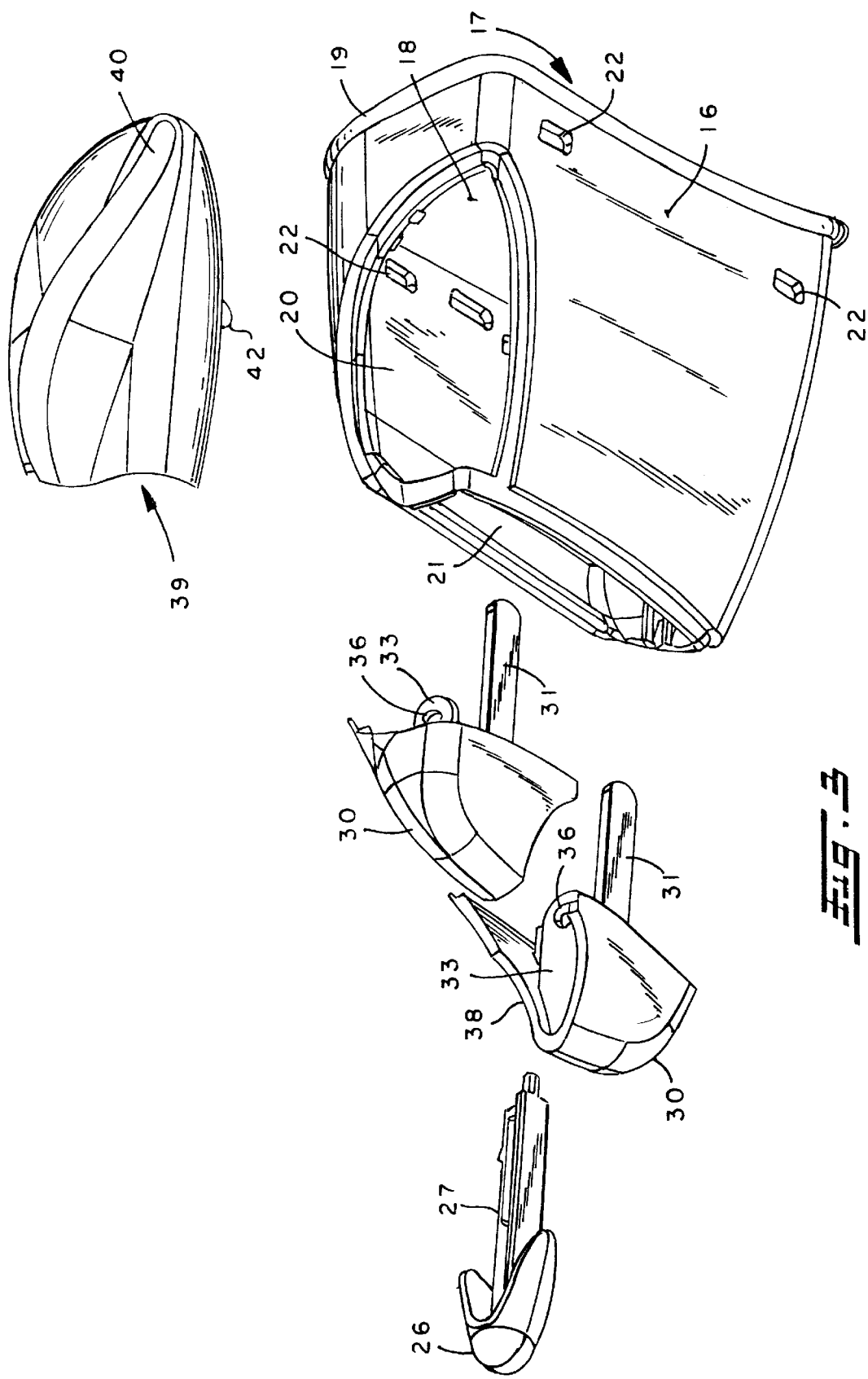
FIG. 3 is a partial exploded view of the switch and the carrier housing of the steering column switch per FIGS. 1 and 2; and, FIG. 4 is a perspective bottom view of the carrier with plug-in fastening of the steering column switch of FIGS. 1 and 2.

The carrier 2 is covered by a carrier housing 16, shown in FIG. 3. This has an open side indicated generally at 17, through which the plug-in fastening 3 of the carrier 2 protrudes. The passageway 18 formed by the open side 17 is surrounded at its margin by a gasket 19 of rubber or synthetic material, which in the assembled condition, with the steering column switch 1 secured to the holder of the casing tube of the vehicle's steering column, is applied to form a seal at the steering column housing. The carrier housing 16 has an opening 20 at the side and an opening 21 at the front end. Openings 22 are distributed on the casing of the carrier housing 16, and engage with clip lugs 23, formed on the carrier wall 6 of the carrier 2. In this way, the carrier housing 16 is secured to the carrier 2.

Figure 4:
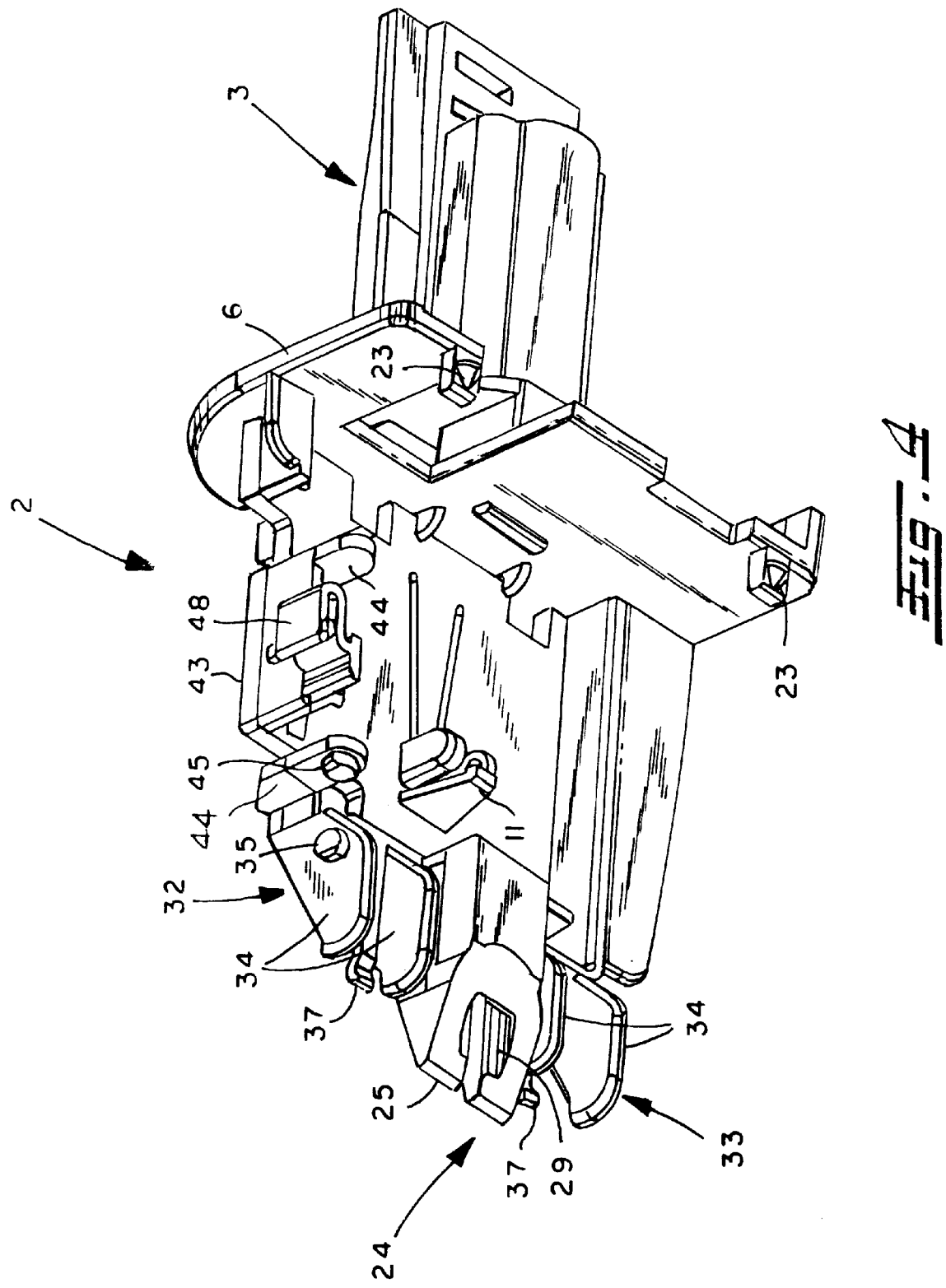

Referring to FIG. 4, at the front side indicated generally at 24 of the carrier 2, a receptacle 25 is formed. In this receptacle 25 is inserted a push key 26 which has a switch element 27 which can be activated in the radial direction of insertion of the steering column switch 1. The direction of action of the push key 26 is indicated by arrow A in FIG. 1. At the end of the switch element 27 there is disposed a spring element 28, which can engage with the upright fastened contact element 14, so that when the push key 26 is activated, a switch function is initiated by the contact element 14. The switch element 27 of the push key 26 is preferably T-shaped in cross section and is received in a corresponding guide groove 29 of the receptacle 25.

On either side of the push key 26 there is arranged a toggle key 30 at the front side 24 of the carrier, each of them having a switch element 31, which acts on a mating contact element 13 on the circuit board 12. The direction of action of the toggle keys 30 is indicated by arrow B in FIG. 1. The push key 26 and the toggle keys 30 with the steering column switch 1 assembled protrude through the opening 21 in the front side of the carrier housing 16.

Each of the toggle keys 30 is mounted in a bearing pedestal 32 formed on the carrier 2 and provided with a pair of bearing brackets 33. Likewise, each bearing pedestal 32 for the toggle keys 30 has pairs of bearing brackets 34, on each of which is formed a bearing journal 35. These bearing journals 35 engage with corresponding bearing journal openings 36 which are formed in the pairs of bearing brackets 33 of the toggle keys 30.

At the front side 24 of the carrier 2 for the toggle keys 30 there is formed between each bearing pedestal 32 a clawlike spring element 37, which thrusts against the inside of the corresponding toggle key 30, the claw shape of the spring element 37 being adapted to the shape of the toggle key 30 in this area. By this means, the toggle key 30 is automatically returned to its starting position. The activation surface 38 of the toggle key 30 is located on one of its outer sides.

On one lengthwise side of the carrier 2 there is arranged a swivel key 39, which protrudes through the opening 20 in the carrier housing 16. This swivel key 39, due to its large engagement surface, is provided with a curved activation bulge 40 on its outside, which also supports an upward and downward motion according to the double arrow C in FIG. 1. From the inside of the swivel key 39 there extend two parallel-spaced switch elements 41 and 42, each of which activates a contact element 13 on the top and bottom side, respectively, of the circuit board 12.

At the side of the carrier 2 there is provided a bearing pedestal 43, being formed from a pair of bearing brackets 44, provided with bearing journals 45 to detain the swivel key 39. The swivel key 39 also has a pair of bearing brackets 46, provided with bearing bracket openings 47, which engage with the bearing journals 45 of the pair of bearing brackets 44 of the bearing pedestal 43. Between the pair of bearing brackets 44 of the bearing pedestal 43 there is formed a spring element 48 on the carrier 2, which thrusts against a bulge 49 on the inside of the swivel key 39 and thereby forces it to automatically return to its resting, zero, or starting position after being activated.

Although the invention has hereinabove been described with respect to the illustrated embodiments, it will be understood that the invention is capable of modification and variation and is limited only by the following claims.

What is claimed is:

1. A switch assembly for mounting on a vehicle steering column, comprising:
    (a) a carrier adapted for mounting on the steering column, said carrier including a plug-in fastening portion for insertion in one direction in a plug-in connection on the steering column, and a switch mounting portion, said switch mounting portion including an electrical connection unit adapted for external electrical connection thereto;
    (b) a plurality of switching elements mounted on said carrier switch mounting portion, said switching elements electrically connected to said electrical connection unit;
    (c) a plurality of user-moveable push keys individually moveably mounted on said carrier switch mounting portions with each of said push keys operable for actuating and de-actuating one of said switching elements, wherein said carrier includes a pre-weakened area for providing a predetermined breaking point disposed between said plug-in fastening portion and said switch mounting portion.

2. The switch assembly defined in claim 1, wherein said pre-weakened area comprises an annular groove.

3. The switch assembly defined in claim 1, wherein said push keys are moveable in different directions of activation.

4. The switch assembly defined in claim 1, further comprising a carrier housing covering said switching elements and said switch mounting portion of said carrier.

* * * * *